United States Patent [19]

Moak

[11] Patent Number: 4,660,650

[45] Date of Patent: Apr. 28, 1987

[54] SOD CUTTING APPARATUS

[76] Inventor: Ross D. Moak, Rt. 1, Box 33, Athens, La. 71003

[21] Appl. No.: 767,748

[22] Filed: Aug. 22, 1985

Related U.S. Application Data

[63] Continuation-in-part of Ser. No. 591,025, Mar. 19, 1984, Pat. No. 4,577,697.

[51] Int. Cl.[4] ............................................. A01B 45/02
[52] U.S. Cl. ..................................... 172/21; 172/705; 172/573; 172/665; 172/764
[58] Field of Search ................. 172/21, 573, 158, 166, 172/178, 180, 19, 20, 764, 665, 666, 394, 705, 572

[56] References Cited

U.S. PATENT DOCUMENTS

| | | | |
|---|---|---|---|
| 108,712 | 10/1870 | Leslie | 172/394 |
| 1,062,660 | 5/1913 | Nugent | 172/573 |
| 1,445,705 | 2/1923 | Nuernberger | 172/394 |
| 1,796,629 | 3/1931 | Stabenow | 172/178 X |
| 1,829,745 | 11/1931 | Grossi | 172/705 X |
| 2,464,038 | 3/1949 | Horth | 172/21 |
| 2,690,635 | 10/1954 | Garza | 172/245 X |
| 3,635,291 | 1/1972 | Tomanek | 172/573 |
| 3,963,079 | 6/1976 | Carlucci | 172/392 |

Primary Examiner—Richard J. Johnson
Attorney, Agent, or Firm—John M. Harrison

[57] ABSTRACT

A sod cutting apparatus which includes a generally flat slide member having an upturned frontal portion and multiple slots extending in parallel, spaced relationship from front to rear, hinge arms pivoted to upward standing fulcrums secured to the slide member, the hinge arms and fulcrums provided in alignment with the slots, respectively, and round blades rotatably secured to the free ends of the hinge arms and projecting through the slots, respectively, with an adjusting mechanism secured to each hinge arm and provided with a core spring for adjusting downwardly-applied tension on the blades. In a preferred embodiment, a spring-biased plow attachment is mounted to the slide member rearwardly of the blades to aid in cutting and breaking up of the sod.

17 Claims, 11 Drawing Figures

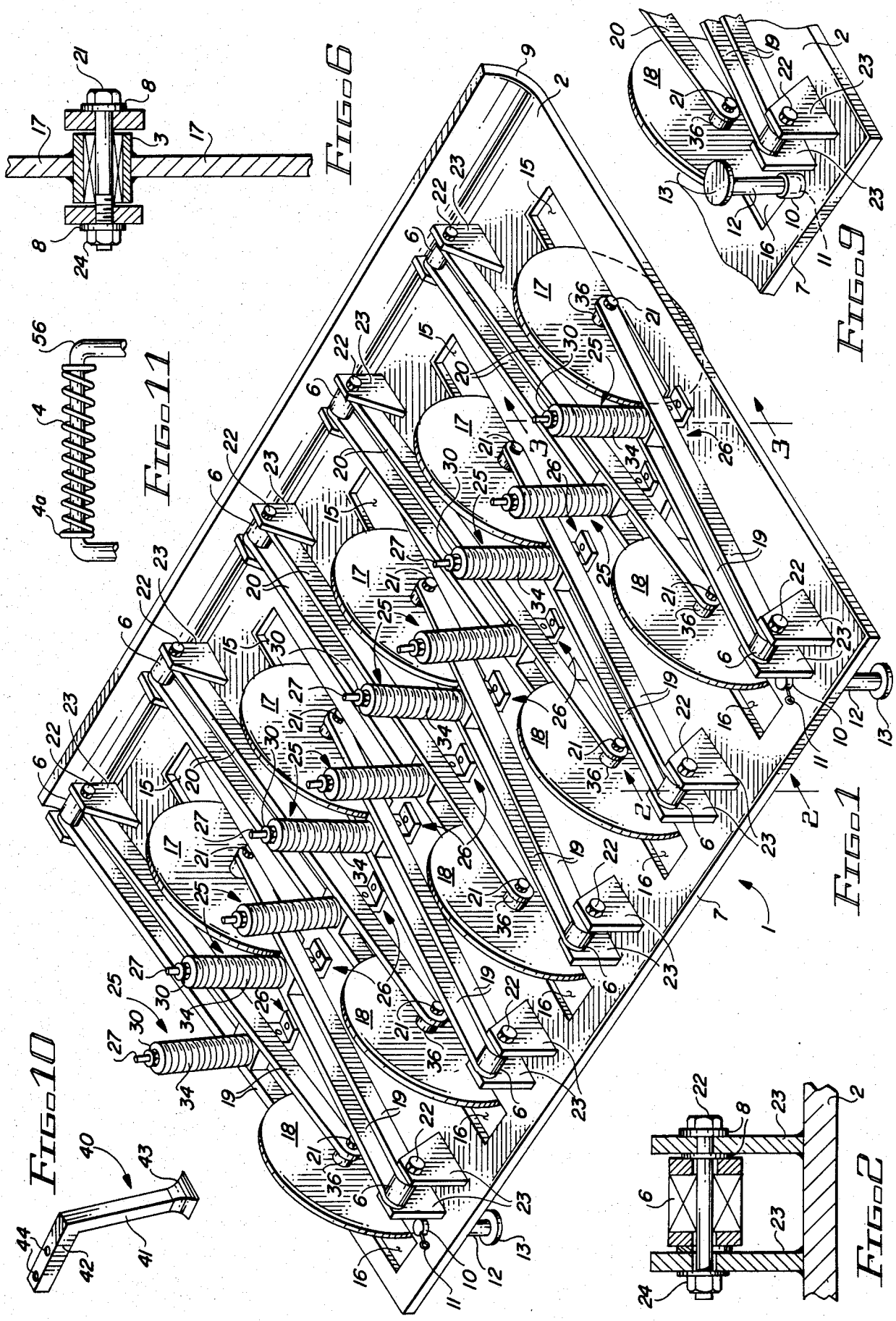

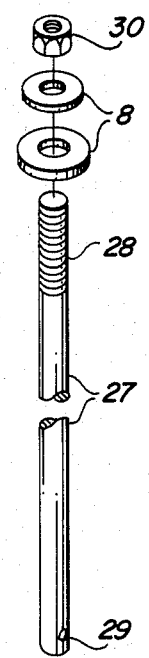
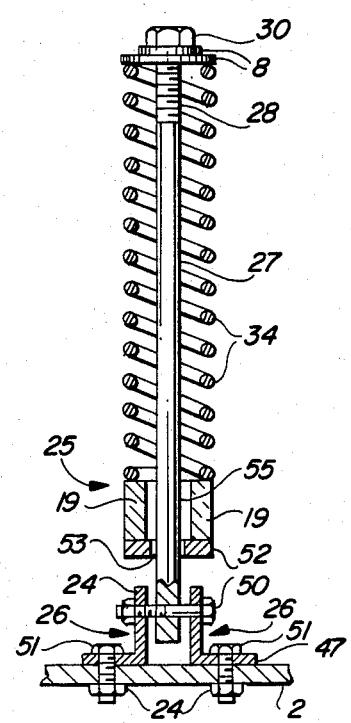
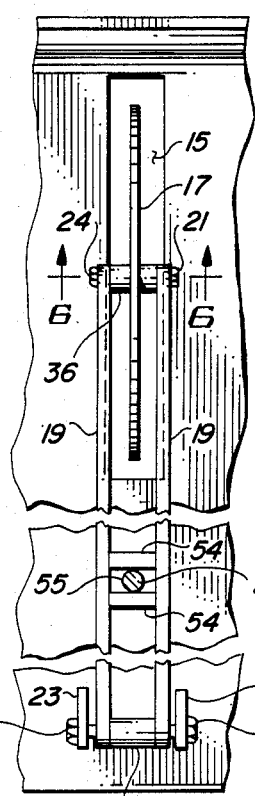
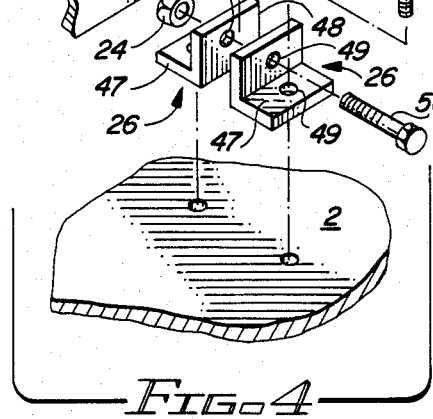
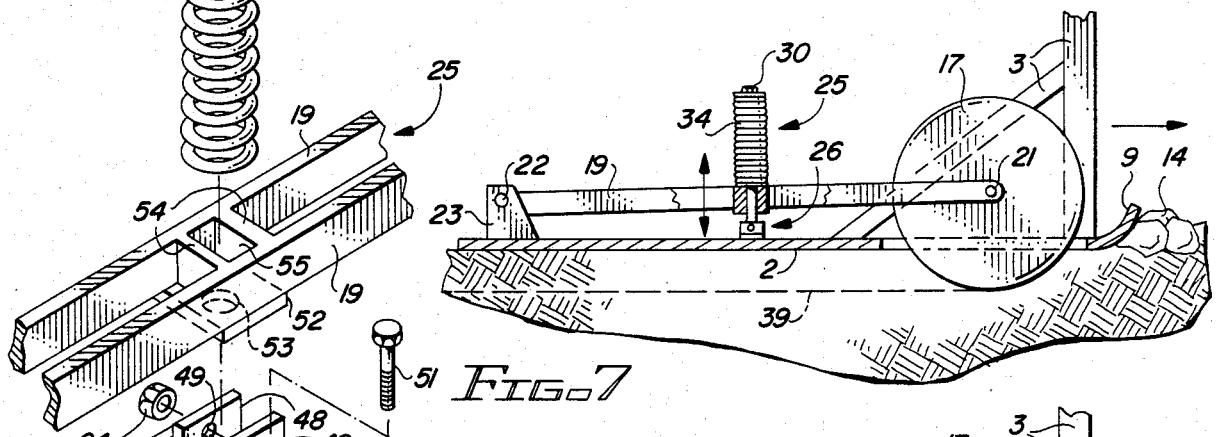
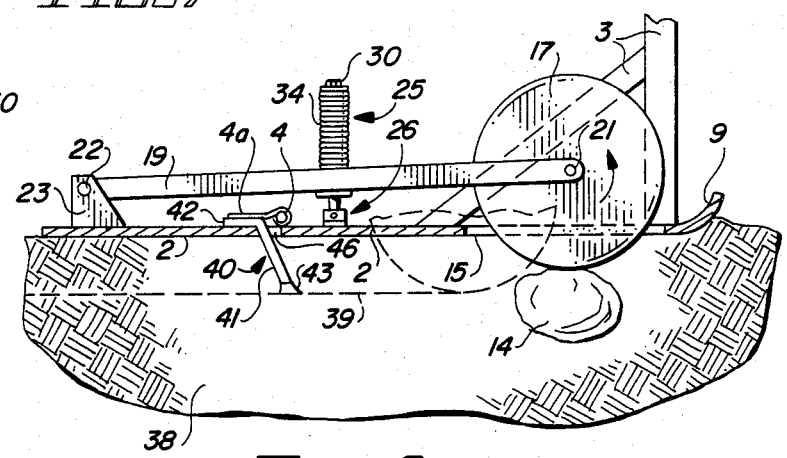

SOD CUTTING APPARATUS

BACKGROUND OF THE INVENTION

Cross-Reference to Related Application

This application is a continuation-in-part of my copending patent application Ser. No. 591,025, filed Mar. 19, 1984 now U.S. Pat. No. 4,577,697.

Field of the Invention

This invention relates to apparatus for cutting and loosening the soil without turning the sil over and more particularly, to a sod cutting apparatus which is characterized by a flat slide member having an upturned frontal portion and fitted with a spring-biased blade adjustment mechanism and a conventional three-point tractor attachment for locomotion. Multiple round blades are mounted on the free ends of spring-loaded hinge arms which are pivoted in alternating, front-to-rear relationship on fulcrums secured to the slide, the blades extending through slots provided in the slide to cut slits of selected depth in the earth beneath the slide. Optionally, one or more spring-biased plow implements can be attached to the slide member at a point or points rearwardly of the blades to aid in cutting and loosening the soil. The slide can be pulled in any selected pattern over a specified area of ground to be treated in order to smooth the terrain, loosen the sod and facilitate better penetration of moisture and fertilizer, resulting in deeper root growth of various plants, including hay-producing grass. The sod cutting apparatus of this invention is typically used to prepare hay fields and meadows for an increased yield of such hay-producing grass, but it can also be used in other applications, such as farming, to prepare the ground in order to obtain higher yields of various crops.

DESCRIPTION OF THE PRIOR ART

One of the problems inherent in agriculture is the compacting of the soil in fields and meadows where crops and hay-producing grasses are grown. This compaction results in lower yields of hay and crops because the root structure of the plants is weak, since the roots fail to extend deeply into the soil for proper growth. The "stiff" soil frequently prevents moisture and fertilizer from penetrating to any appreciable depth, particularly in the case of hay fields and meadows, where little or no cultivation is undertaken.

Conventional cultivating implements are designed primarily for farming and include such well known devices as the plow and disc, which are designed not only to cut into the sod, but also to turn it over, producing a rough topography, usually charcterized by regualr "rows" or furrows extending across the field. This operation is ideal under circumstances where crops are to be planted, but it is not conducive to efficient growing and cutting of hay, where smooth terrain is preferred. A smooth, even terrain is desired for hay production in order to operate grass-cutting equipment effectively and realize optimum yields of hay.

Sod cutting apparatus designed to remove, and in some instances, roll or accumulate strips of sod for replanting purposes, are known in the art. An early "Sod Cutter" is disclosed in U.S. Pat. No. 1,179,795, dated Apr. 18, 1916, to M. C. Beaupre. This device includes a horse-drawn sled device which resembles a plow and incorporates adjustable side and bottom cutters for cutting a strip of sod without removing the strip from the ground. After cutting, the sod is rolled and preserved in selected lengths for replanting. Another "Sod Cutter" is dislosed in U.S. Pat. No. 1,942,708, dated Jan. 9, 1934, to D. Junor, et al, which device also resembles a plow and is operated by two men. The sod cutter includes topical wheels which roll on top of the sod, side cutting wheels, which cut a strip of sod corresponding to the width of the apparatus frame and a transverse cutter blade which severs the sod at a selected depth. U.S. Pat. No. 2,164,246, dated June 27, 1939, to R. Q. Kirkpatrick, discloses a "Sod Cutter" which is designed to cut sod in strips of desired thickness and roll the severed strips into a cup-shaped member following the cutting mechanism. A "Sod Roll Forming Apparatus" is disclosed in U.S. Pat. No. 2,987,124, dated June 6, 1961, to G. R. Hadfield. This device is characterized by a rotating knife mounted on a wheel-supported, traveling frame and designed to sever the sod into selected lengths. The sod strips are manipulated at the blade into an initial roll lap, such that the trailing sod drags engage the lapped roll and complete the rolling of each strip. U.S. Pat. No. 3,469,635, dated Sept. 30, 1969, to J. J. Hart, discloses "Sod Cutting Machines" which are drawn by a tractor. A typical machine is characterized by a sod cutter having parallel bars forming a main frame and a cutting share mounted on the lower end of a tilting support which is pivotally mounted between the parallel bars. The depth of cut is selected by means of an adjusting mechanism and the bottom cutting knife is designed to sever two strips of sod simultaneously, while outer knives cut the sides of each sod strip. A "Sod Cutter" which is designed to be operated by a backhoe is disclosed in U.S. Pat. No. 4,049,060, dated Sept. 20, 1977, to C. R. Hoke. This device includes an elongated blade maintained parallel to the earth at a controlled length by a depth control mechanism and featuring a crossbar spanning the blade and pivotally connected to the blade. The crossbar can be attached to a backhoe to draw the blade through the sod and detach a strip of sod of selected length, width and depth. A tractor-mounted "Turf Cutting and Rolling Apparatus" is disclosed in U.S. Pat. No. 4,354,556, dated Oct. 19, 1982, to M. L. Evans. This device is equipped with parallel side cutters located forward of a horizontal bottom cutter, which cutters operate in combination to cut a strip of sod or turf as the tractor advances. The cut sod is then rolled on a roller carrier located behind the tractor.

It is an object of this invention to provide a sod cutting apparatus for flattening the terrain of a field and loosening the soil to facilitate better penetration or air, water and fertilizer and stimulate deeper plant root growth.

Another object of this invention is to provide a new and improved sod cutting apparatus which is provided with a flat slide and vertically oriented rotating blades for flattening and penetrating the soil without turning the sod over, in order to enhance aeration as well as water and fertilizer penetration into the soil.

Yet another object of the invention is to provide an effective, yet simple and safe apparatus for slitting, cutting and plowing sod to a selected depth and in a selected pattern without destroying hay-producing grass, in order to increase air, moisture and fertilizer penetration into the soil while simultaneously flattening and smoothing the terrain.

A still further object of the invention is to provide a sod cutting apparatus for leveling rough terrain and cutting the soil to a predetermined depth and in a predetermined pattern to facilitate better aeration, moisture and fertilizer penetration, which apparatus includes a flat slide provided with multiple parallel slots and round blades projecting through the slots, the blades rotatably mounted on hinge arms which are spring-mounted on the slide to adjust the depth of penetration of the blades.

Still another object of the invention is to provide a new and improved tractor-drawn sod cutting apparatus for improving hay and crop-growing fields, which apparatus will not disturb the contour of the fields, but operates to level the terrain and penetrate the sod smoothly and evenly in a selected pattern and at a controlled depth to facilitate good fertilizer, moisture, and air penetration and promote optimum root growth and plant health.

SUMMARY OF THE INVENTION

These and other objects of the invention are provided in a new and improved sod cutting apparatus which is designed to smooth, penetrate, and plow and level terrain, which apparatus is characterized by a generally flat slide having a conventional three-point tractor attachment, an upturned frontal portion and at least one, and preferably multiple slots provided in alterating relationship from front to rear, with vertically oriented, rotatable blades extending through the slots. The blades are carried by hinge arms mounted on the slide and an adjusting mechanism which utilizes coil springs is located in cooperation with the slide and the hinge arms for adjusting the depth of penetration of the blades. An optional spring-biased plow implement or implements can be removably attached to the slide at a point or points rearwardly of the blades, to better facilitate breaking up the sod beneath the surface of the ground.

BRIEF DESCRIPTION OF THE DRAWINGS

The invention will be better understood by reference to the accompanying drawings, wherein:

FIG. 1 is a perspective view of a preferred sod cutting apparatus having multiple circular blades mounted thereon;

FIG. 2 is a sectional view taken along line 2—2 of the sod cutting apparatus illustrated in FIG. 1;

FIG. 3 is a sectional view taken along line 3—3 of the sod cutting apparatus illustrated in FIG. 1;

FIG. 4 is an exploded view of a preferred blade adjustment mechanism in the sod cutting apparatus;

FIG. 5 is a top view of a blade and cooperating hinge arm, more particularly illustrating a preferred blade mount;

FIG. 6 is a sectional view, taken along line 6—6 in FIG. 5, of the blade and blade hub;

FIG. 7 is a side elevation of the sod cutting apparatus, illustrating a blade in functional orientation penetrating the underlying sod;

FIG. 8 is a side elevation of the sod cutting apparatus illustrated in FIG. 7, with a blade contacting a rock located in the underlying sod;

FIG. 9 is a perspective view of an optional means for locating the legs during operation of the sod cutting apparatus;

FIG. 10 is a perspective view of an optional plow for use with the sod cutting apparatus; and FIG. 11 is a perspective view of a typical coil spring installation in the optional plow implement orientation.

DESCRIPTION OF THE PREFERRED EMBODIMENTS

Referring initially to FIGS. 1, 5 and 6 of the drawings the sod cutting apparatus of this invention is generally illustrated by reference numeral 1 and is shown at rest, supported by four legs 12, each fitted with a flat, disc-shaped foot 13. The sod cutting apparatus 1 includes a generally flat slide member 2, provided with an upturned frontal portion 9 and including forward slots 15 and rear slots 16, provided in spaced, staggered relationship with respect to each other. A first set of fulcrums 23 is mounted in spaced relationship on the slide member 2 just rearwardly of the curved frontal portion 9 and in alignment with the rear slots 16, respectively, and a second set of fulcrums 23 is mounted on the slide member 2 forward of the rear edge 7 and in alignment with the forward slots 15, respectively. The forward hinge arms 19 are each pivoted in parallel relationship at one end to one of the fulcrums 23 located near the rear edge 7 of the slide member 2, respectively, by means of connecting spacers 6, hinge bolts 22 and cooperating nuts 24. The forward hinge arms 19 extend forwardly and downwardly to a point approximately midway of the forward slot 15, as illustrated in FIG. 5. The blade hub 36 of each of the forward blades 17 is situated between the extending ends of each of the forward hinge arms 19, respectively, by means of blade mount bolts 21 and cooperating nuts 24, as is more particularly illustrated in FIG. 6. Free rotation of the forward blades 17 with respect to the forward hinge arms 19 is facilitated by rotation of the blade hubs 36 on the blade mount bolts 21, respectively. Similarly, the rear hinge arms 20 are pivotally secured to the forward ones of the fulcrums 23, respectively, by means of additional hinge bolts 22 and cooperating nuts 24. The rear hinge arms 20 extend rearwardly toward the rear edge 7 and terminate near the center of the rear slots 16, respectively. The rear blades 18 are rotatably secured between respective sets of the rear hinge arms 20, by means of the blade hubs 36, blade mount bolts 21 and additional cooperating nuts 24. It will be appreciated from a consideration of FIG. 1 that the staggered forward slots 15 and rear slots 16 are sufficiently wide to permit unrestricted vertical movement of the forward blades 17 and the rear blades 18, respectively, to facilitate slicing of the forward blades 17 and rear blades 18 into the soil underlying the sod cutting apparatus 1 to a depth almost equal to the radius of the forward blades 17 and rear blades 18, respectively.

Referring now to FIGS. 1 and 7–9 of the drawings in a most preferred embodiment of the invention, a leg sleeve 10 is welded or otherwise secured to the top surface near each of the four corners of the slide member 2 and is provided with an aperture (not illustrated) to receive a pin 11. The legs 12, having a slightly smaller outside diameter than the inside diameter of the leg sleeve 10, are inserted through an opening (not illustrated) in the slide member 2 which registers with the internal bore of the leg sleeve 10. The legs 12 are removably secured in the leg sleeves 10, respectively, by the pin 11, in order to support the sod cutting apparatus 1 when the device is not in use, as illustrated in FIG. 1. Accordingly, when four of the legs 12 are inserted through the slide member 2 and into the leg sleeves 10 as illustrated in FIG. 1 and the pins 11 are inserted in registering pin apertures (not illustrated) provided in both the leg sleeve 10 and the legs 12, respectively, the sod cutting apparatus 1 can be supported off the ground. In another most preferred embodiment, the legs 12 are each provided with a flat, circular disc or foot 13, which helps prevent the legs 12 from sinking into the ground as a result of the weight of the sod cutting apparatus 1. Referring now to FIG. 9, when the sod cutting apparatus 1 is in use the device is lifted by means of the three-point attachment (not illustrated) and the legs 12 are removed from the bottom of the slide member 2 and are reinserted in the leg sleeves 10, as illustrated, for storage during operation of the sod cutting apparatus 1. The conventional three-point attachment is included in the sod cutting apparatus 1 in order to attach the slide member 2 to a tractor for use. Accordingly, referring to FIGS. 7 and 8, the braces 3 extend from connecting arms (not illustrated), one end of which connecting arms are connected to the tractor, and the other ends welded or otherwise secured to the slide member 2, in order to brace the three-point attachment in upward-standing configuration on the slide member 2.

Referring now to FIGS. 1, 3 and 4 of the drawings in a most preferred embodiment of the invention, a blade adjustment is generally illustrated by reference numeral 25 and includes a pair of arm spacers 54, which are welded or otherwise secured between the forward hinge arms 19 and rear hinge arms 20, respectively, as illustrated. The open area, or spring bolt access 55 located between each of the forward hinge arms 19 and the arm spacers 54, accommodate a spring rod 27, having spring rod threads 28 on the top end, and slidably positioned in the spring bolt access 55. In a preferred embodiment of the invention a guide plate 52 is welded or otherwise secured to the bottom surfaces of the forward hinge arms 19 and rear hinge arms 20 adjacent each spring bolt access 55, and is provided with a guide plate opening 53, which is also designed to receive a corresponding spring rod 27. The threaded top end of each spring rod 27 is disposed upwardly through the corresponding guide plate opening 53 and spring bolt access 55, a spring 34 is fitted over the spring rod 27 and the spring rod threads 28 receive washers 8 and an adjusting nut 30, which is threaded on the spring rod threads 28, to seat the washers 8 against the top end of the spring 34. The opposite, or bottom end of each spring rod 27 is pivotally connected to the pivot flanges 48 of a pair of adjustment brackets 26 by means of a pivot bolt 50. Each pivot bolt 50 extends through flange openings 49 in a pair of upward standing pivot flanges 48 and through the pin aperture 29 in a corresponding spring rod 27, to pivotally mount the spring rods 27 between the pivot flanges 48 and mount flanges 47, respectively. The mount flanges 47 of the adjustment brackets 26 are secured to the slide member 2 by means of bracket mount bolts 51 and cooperating nuts 24, as illustrated in FIGS. 3 and 4. Accordingly, it will be appreciated that manipulation of the adjusting nuts 30 on the spring rod threads 28 of the corresponding spring rods 27 varies the tension in the springs 34, which in turn, adjusts the downward force with which the forward blades 17 and the rear blades 18 cut into the underlying soil 38.

Referring now to FIGS. 8, 10 and 11 of the drawings in another preferred embodiment of the invention, a plow 40 extends through a narrow slot 46 in the slide member 2 and is secured by means of a plow bracket 42, bracket apertures 44, cooperating bolts (not illustrated) and a torsion spring 4, to the slide member 2. A plow leg 41 extends downwardly and forwardly from the plow bracket 42 through the slot 46 and terminates in a shaped share 43, which follows the forward blade 17 and aids in loosening the soil 38. The plow bracket 42 is biased into contact with the slide member 2 by means of the spring end 4a of the torsion spring 4, which spring end 4a is welded or otherwise secured to the plow bracket 42. Altenatively, one or more of the plows 40 can be bolted directly to the slide member 2 behind each, or selected ones of the forward blades 17 and rear blades 18, as desired, in order to loosen the soil 38 to a desirable extent. However, in a most preferred embodiment of the invention, the plows 40 are each arranged in cooperation with a torsion spring 4, mounted on a spring bracket 56, which is welded to the slide member 2, as illustrated in FIGS. 8 and 11, to facilitate folding of the plow rearwardly against the bias of the torsion spring 4 when the plow share 43 or plow leg 41 strikes an obstacle.

In operation, and referring again to FIGS. 1, 7, 8 and 9, the sod cutting apparatus 1 is attached to a tractor by means of the three-point attachment, as heretofore described and by procedures well known to those skilled in the art. The sod cutting apparatus 1 is then raised to a point where the legs 12 can be removed from association with the leg sleeves 10, upon removal of the pins 11. The legs 12 are then reinserted in the top segment of the leg sleeves 10, as illustrated in FIG. 9. The slide member 2 is then lowered into contact with the soil 38 and the tension in the springs 34, coupled with the weight of the forward blades 17, forward hinge arms 19, rear hinge arms 20 and the rear blades 18, causes the forward blades 17 and rear blades 18 to cut into the soil 38, as illustrated in FIG. 7. When the sod cutting apparatus is pulled forward in the direction of the arrow by the tractor, the forward blades 17 and rear blades 18 cut parallel slits in tee soil 38, the depth of which slits is indicated by the blade traverse line 39. Furthermore, when installed as illustrated in FIG. 3, the plow 40 enlarges and further defines the parallel slits to aid in breaking up the underlying soil 38. In this manner, the soil 38 is cut to a depth which is determined primarily by the tension in the springs 34, and in a desired pattern, which is determined by the path of the tractor.

Referring again to FIGS. 7 and 8 of the drawings, in addition to serving the function of determining the depth of the blade traverse line 39, the springs 34 also serve to facilitate upward movement of the forward blades 17 and the rear blades 18 upon encountering an obstacle such as a rock 14, lying beneath or on the surface of the soil 38. Upon such an occurrence, the respective forward blades 17 and rear blades 18 which encounter the rock 17 or other obstacle are caused to move upwardly in the direction of the arrow against the bias in the springs 34 and when the obstacle is traversed, the blade returns to the depth of the blade traverse line 39, as illustrated in FIG. 7. As heretofore described, the tension in the springs 34 can be increased to force the forward blades 17 and rear blades 18 downwardly with a greater force, by tightening the adjusting nuts 30 on the spring rods 27 and increasing the tension in the springs 34. Conversely, the pressure exerted on the underlying soil 38 by the forward blades 17 and the rear blades 18 can be reduced by loosening the adjusting nuts 30 on the spring rods 27 and decreasing the tension in the springs 34.

It will be appreciated by those skilled in the art that a selected number of the forward blades 17 and rear blades 18 can be mounted on the slide member 2 as deemed expedient and necessary, depending upon the size of the meadow or field to be traversed and the tractor to be used. Furthermore, the forward blades 17 and rear blades 18 can be arranged in preferred front and rear, staggered relationship as illustrated, or a desired number of forward blades 17 only, utilized. In the alternative, a desired number of rear blades 18 only can be utilized, as deemed expedient and necessary by those skilled in the art. Furthermore, the size and spacing of the forward blades 17 and rear blades 18 can be varied to suit the size and desired blade arrangement in the sod cutting apparatus 1; typically, in a most preferred embodiment of the invention, the forward blades 17 and rear blades 18 are about 20 inches in diameter.

Referring again to FIGS. 8 and 11 of the drawings, in another preferred embodiment of the invention the plow 40 is mounted in pivoting relationship in the slot 46 provided in the slide member 2, as heretofore described. In operation, the tension in the torsion spring 4 is such that the plow share 43 traverses the blade traverse line 39 as the forward blades 17 and rear blades 18 cut through the soil 38 responsive to forward motion of the slide member 2. When the plow share 43 or plow leg 41 contact an obstacle such as a rock 14, the plow leg 41 pivots rearwardly against the tension in the torsion spring 4 to minimize damage to the plow 40.

While the preferred embodiments of the invention have been described above it will be recognized and understood that various modifications may be made therein and the appended claims are intended to cover all such modifications which may fall within the spirit and scope of the invention.

Having described my invention with the particularity set forth above, what is claimed is:

1. A sod cutting apparatus comprising:
   (a) a slide member;
   (b) at least one slot provided in longitudinal orientation in said slide member;
   (c) at least one fulcrum secured to said slide member in substantial alignment with said slot;
   (d) at least one hinge arm having one end pivotally attached to said fulcrum and the opposite end of said hinge arm extending to said slot;
   (e) at least one blade means rotatably secured to said opposite end of said hinge arm and positioned in registration with said slot; and
   (f) a spring bolt access provided in said hinge arm; a spring rod pivotally attached to said slide member and extending upwardly through said spring bolt access; bias means provided in association with said spring rod and said hinge arm; and a nut threadibly secured on one end of said spring rod for adjusting the tension in said bias means and adjusting the depth of penetration of said blade means into the soil beneath said slide member when said slide member is caused to traverse the soil.

2. The sod cutting apparatus of claim 1 further comprising attachment means in cooperation with said slide member for connecting said slide member to a vehicle.

3. The sod cutting apparatus of claim 2 wherein said attachment means is a three-point attachment mechanism and the vehicle is a tractor.

4. The sod cutting apparatus of claim 2 wherein:
   (a) said attachment means is a three-point attachment mechanism and the vehicle is a tractor; and
   (b) said at least one slot is a plurality of slots arranged in substantially parallel relationship in said slide member, said at least one fulcrum is a plurality of fulcrums, said at least one hinge arm is a plurality of hinge arms and said at least one blade means is a plurality of blade means.

5. The sod cutting apparatus of claim 2 wherein:
   (a) said attachment means is a three-point attachment mechanism and the vehicle is a tractor;
   (b) said at least one slot is a plurality of slots arranged in substantially parallel relationship in said slide member, said at least one fulcrum is a plurality of fulcrums, said at least one hinge arm is a plurality of hinge arms and said at least one blade means is a plurality of blade means; and
   (c) said slots, said fulcrums, said hinge arms and said blade means are arranged in alternating relationship with a first alternating row of said blade means facing forwardly of said slide member and a second alternating row of said blade means facing the rearwardly of said slide member.

6. The sod cutting apparatus of claim 2 further comprising at least one plow means carried by said slide member in substantial alignment with said blade means and trailing said blade means for further loosening the sod traverse by said blade means and wherein:
   (a) said attachment means is a three-point mechanism and the vehicle is a tractor; and
   (b) said at least one slot is a plurality of slots arranged in substantially parallel relationship in said slide member, said at least one fulcrum is a plurality of fulcrums, said at least one hinge arm is a plurality of hinge arms and said at least one blade means is a plurality of blade means.

7. The sod cutting apparatus of claim 6 wherein said slots, said fulcrums, said hinge arms and said blade means are arranged in alternating relationship with a first alternating row of said blade means facing forwardly of said slide member and a second alternating row of said blade means facing rearwardly of said slide member.

8. The sod cutting apparatus of claim 6 further comprising support legs removably carried by said slide member for supporting said slide member when said slide member is not in use.

9. The sod cutting apparatus of claim 8 wherein said plow means is pivotally carried by said slide member and further comprising a tension spring provided in cooperation with said plow means, whereby said plow means pivots against the bias of said tension spring when said plow means encounters resistance in the sod.

10. The sod cutting apparatus of claim 1 wherein said at least one slot is a plurality of slots arranged in substantially parallel relationship in said slide members, said at least one fulcrum is a plurality of fulcrums, said at least one hinge arm is a plurality of hinge arms and said at least one blade means is a plurality of blade means.

11. The sod cutting apparatus of claim 10 wherein said slots, said fulcrums, said hinge arms and said blade means are arranged in alternating relationship with a first alternating row of said blade means facing forwardly of said slide member and a second alternating row of said blade means facing rearwardly of said slide member.

12. The sod cutting apparatus of claim 11 wherein said bias means is coil spring located on said spring rod in association with each of said hinge arms.

13. The sod cutting apparatus of claim 1 further comprising at least one plow means carried by said slide member in substantial alignment with said blade means and trailing said blade means for further loosening the sod traversed by said blade means.

14. The sod cutting apparatus of claim 1 further comprising support legs removably carried by said slide member for supporting said slide member when said slide member is not in use.

15. The sod cutting apparatus of claim 1 wherein said bias means further comprises at least one coil spring.

16. A sod cutting apparatus comprising:
 (a) a generally flat slide member having an upturned frontal portion;
 (b) a plurality of slots provided in longitudinal orientation in said slide member;
 (c) a plurality of fulcrums mounted on said slide member, each of said fulcrums provided in spaced, substantial alignment with one of said slots, respectively;
 (d) a plurality of hinge arms pivotally carried by said fulcrums, each of said hinge arms having one end extending to one of said slots, respectively;
 (e) a circular blade rotatably carried by said one end of each of said hinge arms, said blade provided in registration with one of said slots, respectively; and
 (f) a spring bolt access provided in each of said hinge arms, a spring rod pivotally attached to said slide member and extending through each spring bolt access, a coil spring provided in association with said spring rod and said hinge arms, respectively, and a nut threadibly secured to the extending end of said spring rod and contacting said coil spring for adjusting the tension in said coil spring, whereby tension is adjustably applied to said blades.

17. The sod cutting apparatus of claim 16 further comprising attachment means in cooperation with said slide member for connecting said slide member to a vehicle.

* * * * *